United States Patent

Patterson

(10) Patent No.: US 9,206,863 B2
(45) Date of Patent: Dec. 8, 2015

(54) CLUTCH ENGAGEMENT MECHANISM

(71) Applicant: Mark Patterson, Knoxville, TN (US)

(72) Inventor: Mark Patterson, Knoxville, TN (US)

(73) Assignee: Mark Patterson, Knoxville, TN (US)

( * ) Notice: Subject to any disclaimer, the term of this patent is extended or adjusted under 35 U.S.C. 154(b) by 0 days.

(21) Appl. No.: 14/150,329

(22) Filed: Jan. 8, 2014

(65) Prior Publication Data

US 2014/0190786 A1    Jul. 10, 2014

Related U.S. Application Data

(60) Provisional application No. 61/750,586, filed on Jan. 9, 2013.

(51) Int. Cl.
| | |
|---|---|
| *F16C 1/10* | (2006.01) |
| *F16D 11/00* | (2006.01) |
| *F16D 23/12* | (2006.01) |
| *F16D 125/60* | (2012.01) |
| *F16D 125/64* | (2012.01) |

(52) U.S. Cl.
CPC ............ *F16D 23/12* (2013.01); *F16D 2125/60* (2013.01); *F16D 2125/64* (2013.01)

(58) Field of Classification Search
CPC ......................... F16D 2125/60; F16D 2125/64

USPC ......................................................... 192/82 R
See application file for complete search history.

(56) References Cited

U.S. PATENT DOCUMENTS

| | | | |
|---|---|---|---|
| 4,599,913 A | 7/1986 | Dawson | |
| 5,860,892 A | 1/1999 | Korenjak et al. | |
| 5,966,993 A | 10/1999 | Ekins | |
| 6,102,183 A | 8/2000 | Gerken | |
| 6,651,523 B2 | 11/2003 | Chou | |
| 7,264,099 B2 * | 9/2007 | Duignan | 192/43.1 |
| 7,682,255 B2 | 3/2010 | Monis et al. | |
| 7,905,339 B2 * | 3/2011 | Ito et al. | 192/83 |
| 8,100,032 B2 | 1/2012 | Boehm | |
| 8,210,334 B2 | 7/2012 | Inomori et al. | |
| 8,297,425 B1 | 10/2012 | le Roux | |
| 8,356,531 B2 * | 1/2013 | Steffen et al. | 74/501.6 |
| 2008/0000317 A1 * | 1/2008 | Patton et al. | 74/500.5 |
| 2008/0070729 A1 * | 3/2008 | Miller et al. | 474/101 |
| 2008/0141819 A1 * | 6/2008 | Poulos et al. | 74/502.2 |

* cited by examiner

*Primary Examiner* — Rodney H Bonck
*Assistant Examiner* — Lillian Nguyen
(74) *Attorney, Agent, or Firm* — Pitts & Lake, P.C.

(57) ABSTRACT

A clutch engagement mechanism is provided, including a rotational shaft coupled to a clutch plate to engage and disengage the clutch plate in a clutch assembly, an arm extending from the rotational shaft to apply a rotating force to the rotational shaft, and a rotational pulley coupled to a distal end of the arm so as to rotate about a point at the distal end of the arm, and to receive a clutch control cable that provides a rotating force to the rotational pulley and the rotational shaft.

3 Claims, 5 Drawing Sheets

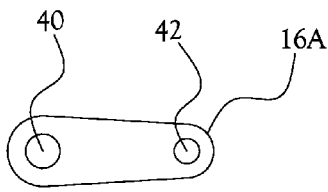
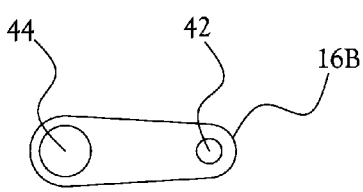
Fig.2E   Fig.2F
Fig.2E'   Fig.2F'
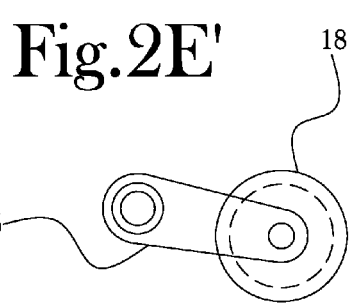
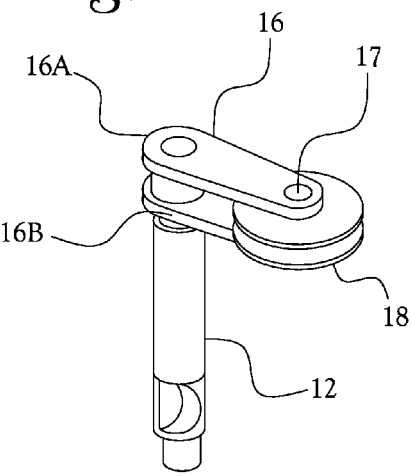
Fig.2G   Fig.2I
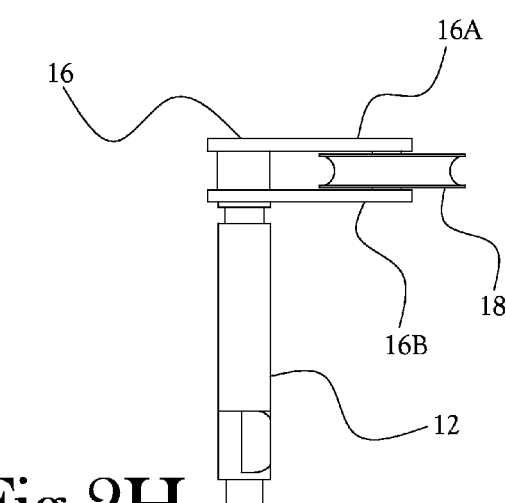
Fig.2H

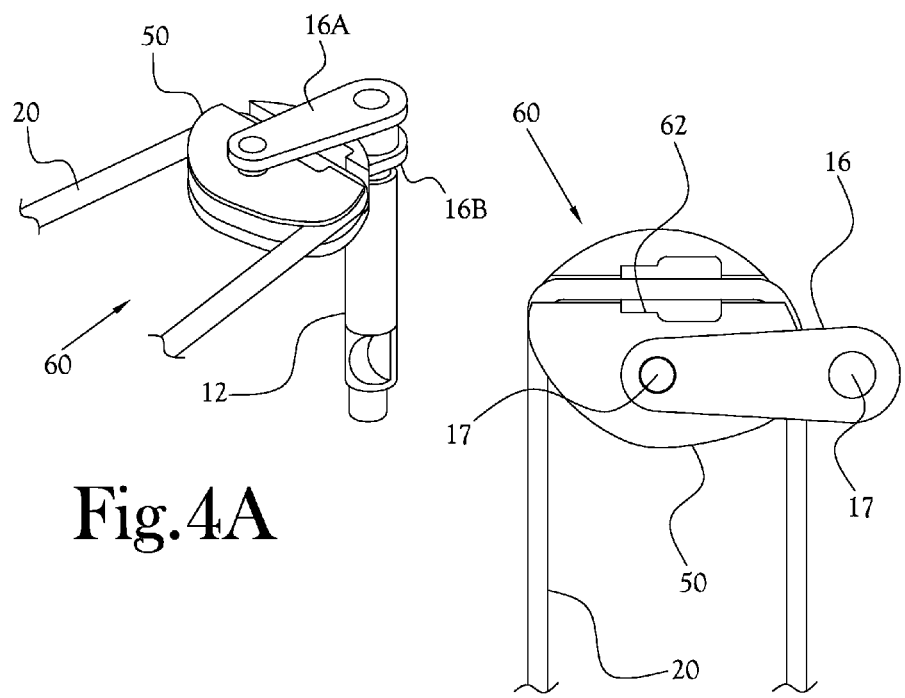
Fig.4A
Fig.4B
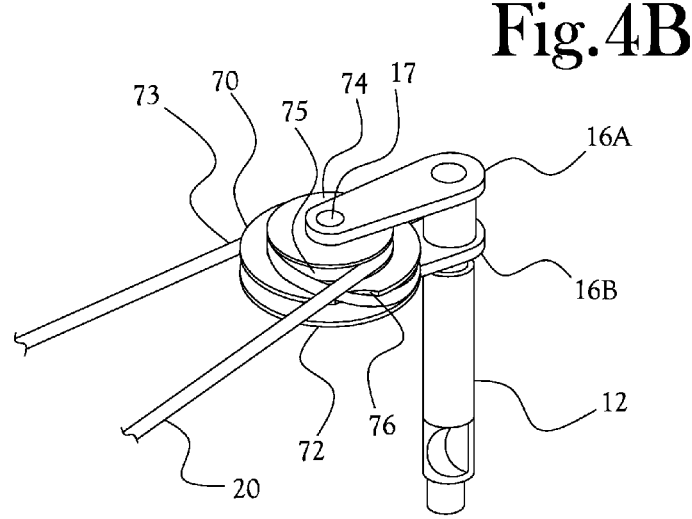
Fig.5

CLUTCH ENGAGEMENT MECHANISM

CROSS-REFERENCE TO RELATED APPLICATIONS

This application claims the benefit of U.S. Provisional Patent Application Ser. No. 61/750,586, filed on Jan. 9, 2013, which is incorporated herein in its entirety by reference.

FIELD OF INVENTION

The present general inventive concept relates generally to a clutch engagement mechanism, and, more particularly, to a motorcycle clutch engagement mechanism with a pulley assembly to reduce the force required to operate a clutch lever.

BACKGROUND

As is well known in mechanics, a clutch is a device that provides for the transmission of power from one component to another. A motorcycle clutch allows the driving power produced by the engine to be transferred to the transmission, which is then transferred to the rear wheel of the motorcycle by a chain, belt, or drive shaft. The clutch of a motorcycle is typically operated by a hand lever located on the handlebar of the motorcycle. If the clutch lever is at rest, the clutch is engaged and the engine power is transferred to the transmission of the motorcycle, and if the clutch lever is engaged, the clutch is disengaged and the power supply from the engine to the transmission is interrupted.

Typically, the clutch is actuated by the clutch lever either hydraulically or mechanically. For a mechanically actuated clutch, one end of a clutch control cable is attached to the clutch lever, and the other end of the clutch control cable is attached to a clutch engagement mechanism which engages and disengages the clutch. In a typical clutch engagement mechanism, a control rod attached to a clutch plate is moved by a rotational shaft having an arm attached at one end, and the clutch control cable is attached at a distal end of the arm. Thus, when an operator of the motorcycle pulls the clutch lever, the force is transferred to the attachment point of the clutch control cable to the arm of the clutch engagement mechanism, which in turn rotates the rotational shaft to move the control rod and disengage the clutch in order to shift gears, or to stop the driving force of the motorcycle.

Therefore, as the clutch lever is directly connected to the arm of the clutch engagement mechanism, and therefore almost all of the force required to be transferred to the arm in order to rotate the rotational shaft is delivered directly from the clutch lever, the motorcycle operator may become fatigued by repeatedly exerting this force to engage and disengage the clutch lever. Such fatigue may become especially problematic if the motorcycle operator is riding under racing conditions, which require numerous and speedy actuation of the clutch over extended periods of time. Thus, a clutch engagement mechanism which relieves the operator of some of the force required to actuate the clutch may be desired.

BRIEF SUMMARY

The present general inventive concept, in various example embodiments, includes a clutch engagement mechanism having a pulley provided at a distal end of an arm thereof to reduce the force required to operate the clutch lever to actuate the clutch for gear changes. Extending a clutch cable around the rotational pulley, and attaching the cable to the frame, motor, or attachment block, reduces the force required to operate the clutch lever.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a clutch engagement mechanism including a rotational shaft coupled to a clutch plate to engage and disengage the clutch plate in a clutch assembly, an arm extending from the rotational shaft to apply a rotating force to the rotational shaft, and a rotational pulley coupled to a distal end of the arm so as to rotate about a point at the distal end of the arm, and to receive a clutch control cable that provides a rotating force to the rotational pulley and the rotational shaft.

The clutch engagement mechanism may further include a clutch lever coupled to a first end of the clutch control cable.

The clutch engagement mechanism may be provided to a motorcycle, and the clutch lever may be attached to handlebar of the motorcycle.

The clutch engagement mechanism may further include an attachment block coupled to a second end of the clutch control cable.

The position of the attachment block may be fixed such that engagement of the clutch lever causes the pulling force transferred to the clutch control cable to rotate the rotational pulley and move the arm of the clutch engagement mechanism.

The rotational pulley may be provided with a groove around a circumference thereof to accommodate the clutch control cable.

The rotational shaft may be coupled to a control rod that is coupled to the clutch plate.

The rotational pulley may be substantially circular and concentric to the point at the distal end of the arm about which the rotational pulley rotates.

The rotational pulley may be configured such that a perimeter of the rotational pulley is eccentric to the point at the distal end of the arm about which the rotational pulley rotates.

The rotational pulley may be configured in a cam shape.

The rotational pulley may include a groove around a portion of the circumference thereof to accommodate the clutch control cable, and a cable receiving section extending between two points of the groove to receive a portion of the clutch control cable across the rotational pulley.

The cable receiving section may include a securing member receiving section to accommodate a securing member to fix the clutch control cable to the rotational pulley.

The rotational pulley may be configured as a two-tiered pulley having a first tier adjacent to a second tier, the first tier being concentric to the second tier and having a larger diameter than the second tier; and wherein each of the first and second tiers each include a groove at least partially around the respective circumferences thereof to receive the clutch control cable.

The grooves of the first and second tiers may be connected by a communication recess provided on a surface of the first tier adjacent to the second tier.

The first tier may be coupled to a fixed point by the clutch control cable, and the second tier is coupled to a clutch lever by the clutch control cable.

The foregoing and/or other aspects and advantages of the present general inventive concept may also be achieved by a clutch engagement mechanism including a rotational shaft coupled to a clutch plate to engage and disengage the clutch plate in a clutch assembly, an arm extending from the rotational shaft to apply a rotating force to the rotational shaft, and a rotational member coupled to a distal end of the arm so as to rotate about a point at the distal end of the arm, the rotational member being configured to contact a rotational control member at a fixed or varying distance away from the point at the distal end of the arm about which the rotational member rotates to reduce a force required to rotate the distal end of the arm.

A rotation axis of the rotational member may be substantially parallel to a rotation axis of the rotational shaft.

The rotational control member may be a clutch control cable having a first end coupled to a clutch lever, and a second end at a fixed point, a portion of the clutch control cable being accommodated by the rotational member.

The rotational member may be configured so as to have a circumference that is eccentric to a rotational center of the rotational member, and such that a first point at which the clutch control cable extends from the rotational member to the clutch lever is closer to the rotational center than is a second point at which the clutch control cable extends from the rotational member to the fixed point.

The rotational member may be configured as a two-tiered pulley having a first tier adjacent to a second tier, the first tier being concentric to the second tier and having a larger diameter than the second tier, and such that a first point at which the clutch control cable extends from the second tier to the clutch lever is closer to the rotational center than is a second point at which the clutch control cable extends from the first tier to the fixed point.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 2A-2I illustrate various example configurations and dimensions of some of the components of the clutch engagement mechanism illustrated in FIG. 1;

FIGS. 4A-4B illustrate portions of a clutch engagement mechanism including the rotational pulley illustrated in FIG. 3; and FIG. 5 illustrates a rotational pulley according to still another example embodiment of the present general inventive concept.

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Various embodiments of the present general inventive concept, as described herein, provide a clutch engagement mechanism having a pulley to reduce the force required to operate the clutch lever to actuate the clutch for gear changes.

Figure 1:
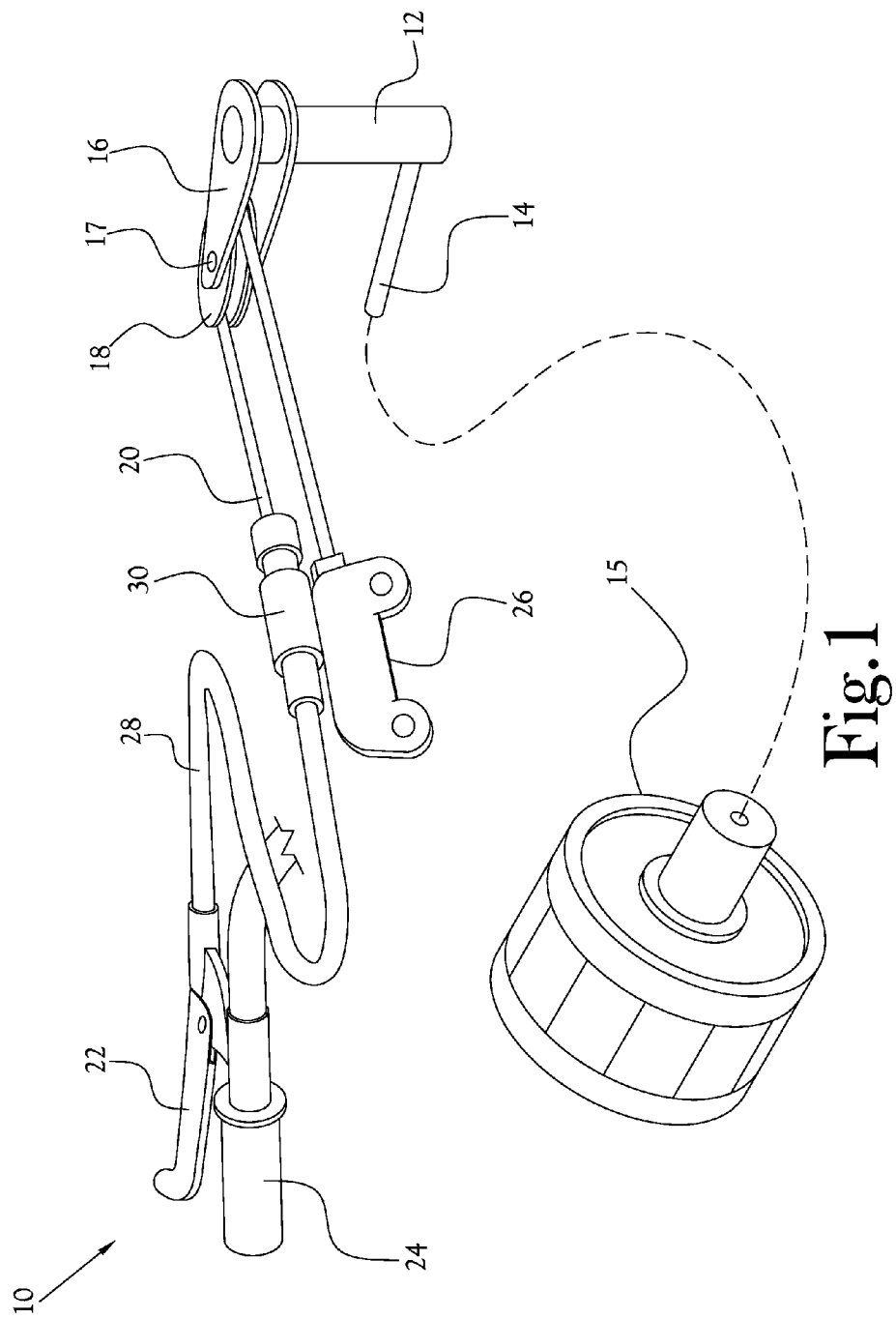
FIG. 1 illustrates a clutch engagement mechanism including a rotational pulley according to an example embodiment of the present general inventive concept.

FIG. 1 illustrates a clutch engagement mechanism including a rotational pulley according to an example embodiment of the present general inventive concept. The embodiment illustrated in FIG. 1 is described as being incorporated in a motorcycle, but it is understood that the clutch engagement mechanism could be used in any number of cable driven clutch engagement mechanisms. The clutch engagement mechanism 10 includes a rotational shaft 12 coupled to a control rod 14 that is coupled to the clutch plate 15. The rotation of the rotational shaft 12 moves the control rod 14 in a general reciprocal fashion to push/pull the clutch plate 15 so as to engage/disengage the clutch. The clutch engagement mechanism 10 also includes an arm 16 coupled to the rotation shaft 12, and a rotational pulley 18 coupled proximate to a distal end of the arm 16. The rotational pulley 18 is provided around a circumference thereof with a groove to accommodate a clutch control cable 20 which has a first end coupled to a clutch lever 22 provided on a handlebar 24 of the motorcycle, and a second end releasably fixed to an attachment block 26 which anchors the second end of the clutch control cable 20.

A sheath 28 is provided around a substantial portion of the clutch control cable 20, and the clutch control cable 20 is movable in a reciprocating direction through the sheath 28. A terminal cylinder 30 may be provided at an end of the sheath 28 opposite the clutch lever 22, through which the clutch control cable 20 extends out of the sheath 28, around the rotational pulley 18, and to the attachment block 26. In various example embodiments, the terminal cylinder 30 may be attached to the attachment block 26. In various example embodiments, the attachment block 26 may be attached to a clutch housing (not shown), motorcycle frame, or any other component which provides a substantially fixed position for the attachment block 26.

The rotational pulley 18 is provided so as to rotate about a point proximate to the distal end of the arm 16. The rotational pulley 18 may be coupled to the arm 16 by a pin 17 which extends through at least a portion of the center of the rotational pulley 18. In various example embodiments, the arm 16 may include an upper and lower portion so as to be coupled to the top and bottom of the rotational pulley 18, and the pin 17 may extend from the upper to the lower portion of the arm 16. In the example embodiment illustrated in FIG. 1, the rotational pulley 18 rotates about the pin 17. It is understood that the pin 17 is merely an example of one type of coupling member that may be used to couple the rotational pulley 18 proximate to the end of the arm 16 so as to allow the rotational pulley 18 to be rotational about the coupling point.

In a conventional cable driven clutch engagement mechanism, the end of the clutch control cable is typically connected to a distal end of the arm which rotates the rotational shaft of the clutch engagement mechanism. For example, a conventional clutch engagement mechanism might have the end of the clutch control cable attached to a point of the arm at which the pin 17 is provided in FIG. 1. In such a conventional configuration, all of the pulling force required to move the arm to rotate the rotational shaft is provided directly by operation of the clutch lever. However, in the example embodiment of the present general inventive concept illustrated in FIG. 1, the force required through the clutch lever 22 to rotate the rotational shaft 12 is reduced by the mechanical advantage provided by the configuration of the rotational pulley 18 which rotates around the pin 17 at the end of the arm 16. In more detail, when the motorcycle operator engages the clutch lever 22, a pulling force is applied to the clutch control cable 20. Because the second end of the clutch control cable 20 is fixed to the attachment block 26, the rotational pulley 18 rotates and also transfers the pulling force to move the arm 16, which rotates the rotational shaft 12 to disengage the clutch. The displacement of the pulling force from the end of the arm 16, combined with the rotation of the rotational pulley 18, reduces the force required to rotate the rotational shaft 12, and therefore to disengage the clutch. To engage the clutch, the operator simply releases the clutch lever, and the rotation of the rotational shaft 12 and rotational pulley 18 occur in the opposite direction. As illustrated in FIG. 1, the rotational axis of the rotational pulley 18 is substantially parallel to the rotational axis of the rotational shaft 12.

Figure 2A:
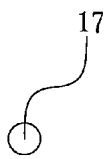
Figure 2B:
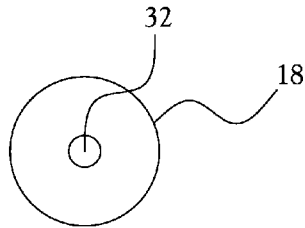
Figure 2A:
Figure 2B:
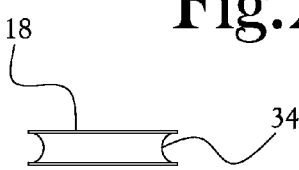
Figure 2C:
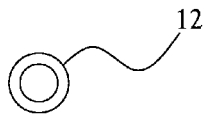
Figure 2C:
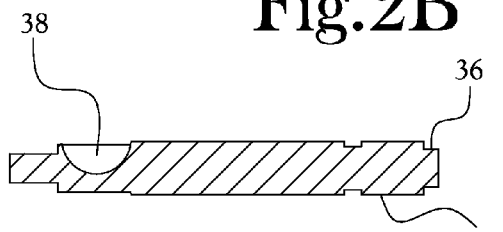
Figure 2D:
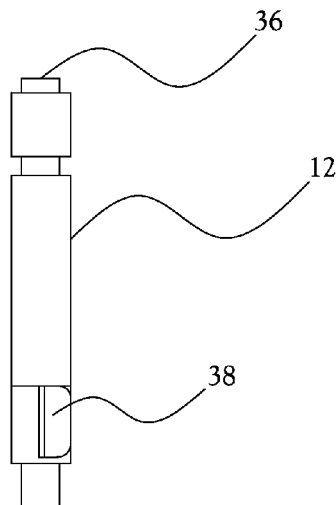

FIGS. 2A-2I illustrate various example configurations of some of the components of the clutch engagement mechanism illustrated in FIG. 1. It is understood that these are simple example embodiments, and a host of other sizes and configurations may be utilized according to the scope of the present general inventive concept. FIGS. 2A-2F' include various isolated views of some of these components, including a top and side view of the pin 17, illustrated in FIGS. 2A and 2A', that couples the rotational pulley 18 to the arm 16 of the rotational shaft 12, a top and side view of the rotational pulley 18, illustrated in FIGS. 2B and 2B', and a top, sectional, and side view, illustrated in FIGS. 2C-2D, of the rotational shaft 12. As illustrated in FIGS. 2B and 2B', the rotational pulley 18 is provided with a through hole 32 which accommodates the pin 17 to couple the rotational pulley 18 to the arm 16 of the rotational shaft 12, and a cable groove 34 to accommodate the clutch control cable 20. As illustrated in FIGS. 2C-2D, the rotational shaft 12 is provided with at least one arm receiving portion 36 at a first end thereof to accommodate the arm 16. In the example embodiment illustrated in FIGS. 2E-2F', the arm 16 includes two substantially similar members 16A,16B, at least one of which is configured to fit in the arm receiving portion 36 provided on the rotational shaft 12, and to be respectively oriented at opposite surfaces of the rotational pulley 18. The rotational shaft 12 is also provided with a control rod receiving portion 38 to receive the control rod which is coupled to the clutch plate 15 of the clutch engagement mechanism 10. It is understood that the components illustrated in FIGS. 2A-2F' are merely example embodiments of the present general inventive concept, and various other configurations may be used. For example, the arm 16 may be formed integrally with the rotational shaft 12, and so on. As another example, the control rod 14 may be replaced with any of a host of types of linkages to couple the action of the rotational shaft 12 to the clutch plate 15 to operate the engagement and disengagement of the clutch.

FIGS. 2E-2F' illustrate the arm 16 as having top and bottom portions 16A and 16B, and top and side views of each of the top and bottom portions 16A and 16B are illustrated. In this example embodiment of the present general inventive concept, the top portion 16A includes a first through hole 40 to accommodate the arm receiving portion 36 of the rotational shaft 12, and a second through hole 42 to receive the pin 17 to couple the top portion 16A of the arm 16 to the rotational pulley 18. The bottom portion 16B includes a first through hole 44 to receive the outer diameter of the rotational shaft 12, and a second through hole 42 which is substantially similar to that of the top portion 16A, to receive the pin 17 to couple the bottom portion 16B of the arm 16 to the rotational pulley 18. In other example embodiments of the present general inventive concept, the rotational shaft 12 may be provided with arm receiving portions for both top and bottom portions of the arm 16, and therefore the first through holes of the arm portions may be of a substantially similar diameter. The top and bottom portions 16A and 16B may be coupled to the rotational shaft 12 in any of a variety of means, such as adhesives, spot welding, and so on. Various other example embodiments of the present general inventive concept may provide an arm 16 with only a single body that is affixed to either the top or bottom portion of the rotational pulley 18. It is understood that the terms "top" and "bottom" are merely used to aid the description of the example embodiment illustrated in FIGS. 2A-2I, and no such particular orientation is required for the operation of the present general inventive concept.

FIGS. 2G-2I include top, side, and perspective views of the assembled rotational shaft 12, arm 16, and rotational pulley 18 according to an example embodiment of the present general inventive concept. As previously described, the through holes 40 and 44 of the respective top portion 16A and bottom portion 16B of the arm 16 are configured to receive a first end of the rotational shaft 12 to couple a first end of the arm 16 proximate to the first end of the rotational shaft 16. The rotational pulley 18 is coupled to a second end of the arm 16 by the pin 17 that is accommodated by the through holes 42 of the top and bottom portions 16A and 16 B, as well as the through hole 32 of the rotational pulley 18. As previously described, the engagement of the clutch lever 22 and resulting pulling force on the clutch control cable 20 rotates the rotational pulley 18 about the pin 17, and, due to the other end of the clutch control cable 20 being fixed to the attachment block 36, also rotates the arm 16 about the axis of the rotational shaft 12. The rotation of the rotational pulley 18 about the axis of the pin 17 lessens the force required to rotate the arm 16 about the axis of the rotational shaft 12, resulting in less fatigue for the operator of the clutch engagement mechanism 10. According to various example embodiments of the present general inventive concept, different sizes of rotational pulleys may be used to alter the force required to operate the clutch engagement mechanism. Also, as described later, several different configurations of rotational pulleys may be used in various example embodiment of the present general inventive concept to adjust the amount of rotation of the rotational shaft 12.

As discussed in the description of FIGS. 1-2I, the mechanical advantage provided by the rotational pulley 18 located proximate to the end of the arm 16 reduces the force required on the clutch lever 22 to rotate the rotational shaft 12 to operate the clutch. However, in some example embodiments, the reduction in force required on the clutch lever 22 may result in some loss of actual rotation of the rotational shaft 12. For example, if a conventional clutch lever that is not provided with such a rotational pulley, but rather is coupled directly to the end of the arm of the rotational shaft, is engaged to as to pull 8 mm of the clutch control cable through the sheath, then arm of the rotational shaft will be moved approximately the same length around the radius of the rotational shaft that matches the distal end of the arm. By providing a rotational pulley proximate to the end of the arm, the same 8 mm of clutch control cable that is pulled at the clutch lever may only translate to, for example, 4-5 mm of movement of the distal end of the arm around the rotational shaft. In other words, a percentage of the rotation of the rotational shaft corresponding to the diameter of the rotational pulley provided at the end of the arm may be lost. In some configurations, such a result may cause additional adjustments at other portions of the linkage between the rotational shaft and the clutch plate. Therefore, various example embodiments of the present general inventive concept may provide a rotational pulley having a center of rotation that is offset from the center of the rotational pulley itself, and/or a configuration wherein a point at which the clutch control cable extending from the clutch lever first contacts the rotational pulley has a different radius from the center of rotation than does a point at which the clutch control cable extending from the attachment block first contacts the rotational pulley. By varying the distance from the center of rotation of the rotational pulley to the respective points at which the clutch control cable extend from the rotational pulley, the amount of rotation at those respective points is correspondingly varied. In more detail, in a case in which the rotational pulley is substantially round and centered on a rotational axis, the point at which the clutch control cable extends from the rotational pulley to the clutch lever will always be located at substantially the same distance from the center of rotational of the rotational pulley as is the point at which the clutch control cable extends from the rotational pulley to the attachment block. In other words, the length of cable "leaving" the rotational pulley will be the same as the length of cable being wound onto the rotational pulley. However, if the point at which the clutch control cable extends from the rotational pulley to the clutch lever is closer to the rotational center of the rotational pulley than is the point at which the clutch control cable extends from the rotational pulley to the attachment block, then a length of cable drawn onto the rotational pulley from the attachment block end will be longer than a length of cable "leaving" the rotational pulley on the clutch lever end when the clutch lever is squeezed. This differential caused by the different radii of those clutch cable contact points with the rotational pulley may be used to increase the movement of the rotational shaft. FIGS. 3A-5 illustrate example embodiments of the present general inventive concept that utilize such pulley-cable contact points of different radii.

Figure 3A:
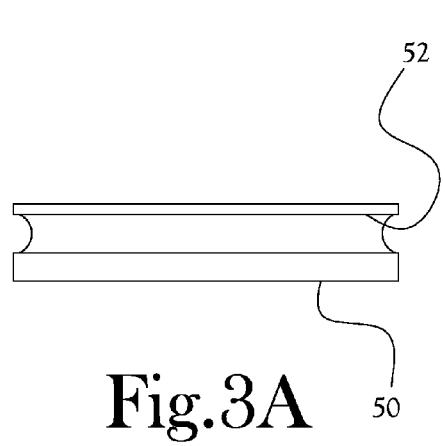
FIGS. 3A-3D illustrate a rotational pulley according to another example embodiment of the present general inventive concept.
Figure 3B:
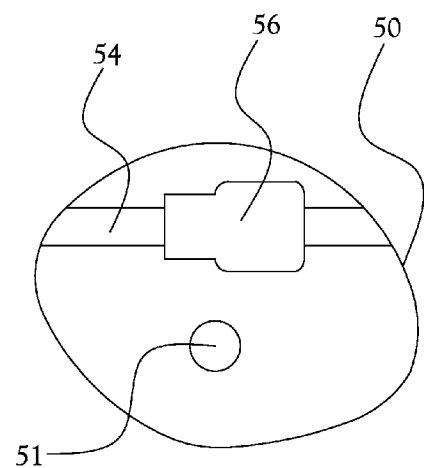
Figure 3C:
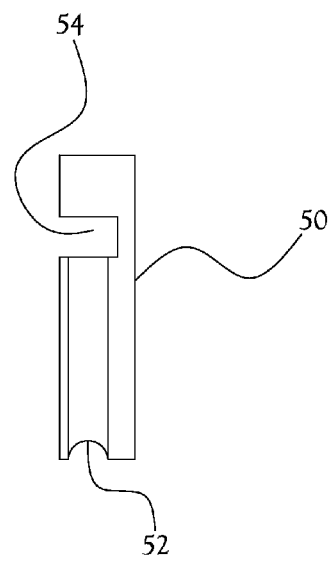
Figure 3D:
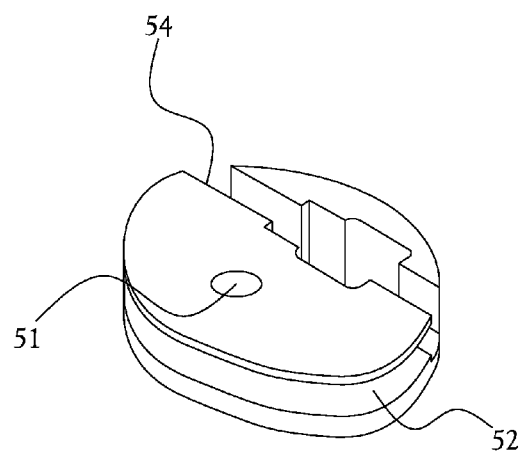

FIGS. 3A-3D illustrate a rotational pulley according to another example embodiment of the present general inventive concept, wherein a provided rotational pulley 50 has a circumference that is not concentric to the rotational center of the rotational pulley 50. FIG. 3A illustrates a front view of the rotational pulley 50, FIG. 3B illustrates a top view of the rotational pulley 50, FIG. 3C illustrates a side view of the rotational pulley 50, and FIG. 3D illustrates a perspective view of the rotational pulley 50. In the example embodiment illustrated in FIGS. 3A-3D, the rotational pulley 50 is configured as a cam to provide the eccentric configuration of the rotational pulley 50 relative to the center of rotation 51. It is understood that the eccentric configuration of such a rotational pulley may be achieved without the cam shape illustrated in the example embodiment illustrated in FIGS. 3A-3D. In various example embodiments, the cam configured rotational pulley 50 may be provided with a cable groove around the entirety of the perimeter, similar to that provided to the example circular embodiment illustrated in FIG. 2A. In the example embodiment illustrated in FIG. 3, the rotational pulley 50 is provided with a cable groove 52 around only a part of the perimeter of the rotational pulley 50, and a cable receiving section 54 which allows the clutch control cable to pass through the rotational pulley 50 from two side points. In the example embodiment illustrated in FIG. 3, the cable receiving section 54 is formed as a recess in the surface of the rotational pulley 50, but various other example embodiments may be configured in different ways, such as a fully enclosed through section between the two side points of the rotational pulley 50. The example embodiment illustrated in FIG. 3 also includes a securing member receiving section 56 to receive a securing member, such as a locking nut, etc., that is coupled to the clutch control cable to secure the clutch control cable to the rotational pulley 50 to prevent any slipping of the clutch control cable through cable receiving section 54 or the cable groove 52 during the operation of the clutch engagement mechanism. Various example embodiments of the present general inventive concept may provide any of a number of securing means to secure the clutch control cable to the rotational pulley 50, and the securing means may be integral to the rotational pulley 50 or clutch cable, or separately formed. Such a securing means may be a mechanical body, an adhesive, and so on. Also, various example embodiments of such a rotational pulley may be provided with a groove that accommodates the clutch control cable only about a portion of the circumference of the rotational pulley, rather than passing through the body of the rotational pulley, and may be provided with a securing means at the circumference to fix the clutch control cable to the rotational pulley.

FIGS. 4A-4B illustrate portions of a clutch engagement mechanism 60 including the rotational pulley 50 illustrated in FIG. 3. FIG. 4A illustrates a partial perspective view of the clutch engagement mechanism 60, and FIG. 4B illustrates a top view of the same assembly. As illustrated in FIGS. 4A-4B, the clutch control cable 20 is accommodated in the cable groove 52 and the cable receiving section 54, and is provided with a securing member 62 coupled to the clutch control cable 20 that is accommodated in the securing member receiving section 56 to secure the clutch control cable 20 to the rotational pulley 50. According to various example embodiments of the present general inventive concept, other components and connections of the clutch engagement mechanism 60 may be similar to those illustrated in FIG. 1. As with the clutch engagement mechanism illustrated in FIG. 1, the engagement of the clutch lever 22 pulls the clutch control cable 20 to cause a rotational force to be applied to the rotational pulley 50, as well as to the arm 16 coupled to the rotational pulley 50, to rotate the rotational shaft 12 to disengage the clutch plate 15. As illustrated in FIGS. 4A-4B, the point at which the clutch control cable 20 extends from the rotational pulley 50 to the clutch lever 22 is a shorter distance from the rotational center, which is the pin 17, of the rotational pulley 50 than is the point at which the clutch control cable 20 extends from the rotational pulley 50 to the attachment block 26. Thus, the length of clutch control cable 20 wound onto the rotational pulley 50 when the clutch lever 22 is pulled will be longer than the length of clutch cable 20 leaving the rotational pulley 50 during the pull of the clutch lever 22, resulting in an increased rotation of the rotational shaft 12 over a similar clutch lever pull made in a concentrically configured rotational pulley.

FIG. 5 illustrates a rotational pulley according to still another example embodiment of the present general inventive concept. In this example embodiment, a concentric two-tiered rotational pulley 70 is provided to the clutch engagement mechanism to provide the different distances from the center of rotation of the rotational pulley 70 at which the clutch control cable 20 extends respectively to the clutch lever 22 and the attachment block 26. According to various example embodiments of the present general inventive concept, the remaining components not illustrated in FIG. 5 may have a configuration substantially similar to those illustrated in FIG. 1. The two-tiered rotational pulley 70 configuration includes a first tier 72 adjacent to a concentric second tier 74, with the second tier 74 having a smaller diameter than the first tier 72. As illustrated in FIG. 5, the portion of the clutch control cable 20 extending from the attachment block 26 is received in the cable groove 73 of the first tier 72, and the portion of the clutch control cable 20 extending from the clutch lever 22 is received in the cable groove 75 of the smaller in diameter second tier 74. Thus, both the first tier 72 and the second tier 74 are concentric to the center of rotation of the rotational pulley 70. As the circumference of the first tier 72 is located farther from the rotational axis of the rotational pulley 70 than is the circumference of the second tier 74, the length of clutch control cable 20 wound onto the first tier 72 of the rotational pulley 70 when the clutch lever 22 is pulled will be longer than the length of clutch cable 20 leaving the second tier 74 of the rotational pulley 70 during the pull of the clutch lever 22, resulting in an increased rotation of the rotational shaft 12 over a similar clutch lever pull made in a concentrically configured and single-tiered rotational pulley. In various example embodiments, the clutch control cable may be partitioned into two separate portions, with a first portion being relegated to the cable groove 73 of the first tier 72, and a second portion being relegated to the cable groove 75 of the second tier 74. In other various example embodiments, such as the one illustrated in FIG. 5, the clutch control cable 20 may be continuous from the clutch lever 22 to the attachment block 26, and is communicated from the larger diameter cable groove 73 to the smaller diameter cable groove 75 through a tier communication recess 76 provided in the larger diameter first tier 72. In more detail, the clutch control cable 20 may be provided around a portion of the perimeter of the larger diameter first tier 72 in the cable groove 73, and through the tier communication recess 76 to the cable groove 75 of the smaller diameter second tier 74, as illustrated in FIG. 5. The top and bottom portions 16A and 16B of the arm 16 may be spaced farther from one another than the configuration illustrated in FIG. 1 in order to accommodate the increased width of the two-tiered rotational pulley 70. According to various example embodiments of the present general inventive concept, the first and second tiers 72 and 74 may be formed integrally, or formed separately and adhered to one another by any of a number of adhering means.

According to various embodiments of the present general inventive concept, a clutch engagement mechanism having a rotational pulley to reduce the force required to operate the clutch lever to actuate the clutch for gear changes is provided. The reduction in force required to operate the lever reduces the exertion required of an operator's hand, and increases the speed of operation, during gear changes.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A clutch engagement mechanism comprising:
   a rotational shaft coupled to a clutch plate to engage and disengage the clutch plate in a clutch assembly;
   an arm extending from the rotational shaft to apply a rotating force to the rotational shaft; and
   a rotational pulley coupled to a distal end of the arm so as to rotate about a point at the distal end of the arm, and to receive a clutch control cable that provides a rotating force to the rotational pulley and the rotational shaft;
   wherein the rotational pulley is configured as a two-tiered pulley having a first tier adjacent to a second tier, the first tier being concentric to the second tier and having a larger diameter than the second tier; and wherein each of the first and second tiers each include a groove at least partially around the respective circumferences thereof to receive the clutch control cable, and
   wherein the grooves of the first and second tiers are connected by a communication recess provided on a surface of the first tier adjacent to the second tier.

2. A clutch engagement mechanism comprising:
   a rotational shaft coupled to a clutch plate to engage and disengage the clutch plate in a clutch assembly;
   an arm extending from the rotational shaft to apply a rotating force to the rotational shaft; and
   a rotational pulley coupled to a distal end of the arm so as to rotate about a point at the distal end of the arm, and to receive a clutch control cable that provides a rotating force to the rotational pulley and the rotational shaft;
   wherein the rotational pulley is configured as a two-tiered pulley having a first tier adjacent to a second tier, the first tier being concentric to the second tier and having a larger diameter than the second tier; and wherein each of the first and second tiers each include a groove at least partially around the respective circumferences thereof to receive the clutch control cable, and
   wherein the first tier is coupled to a fixed point by the clutch control cable, and the second tier is coupled to a clutch lever by the clutch control cable.

3. A clutch engagement mechanism comprising:
   a rotational shaft coupled to a clutch plate to engage and disengage the clutch plate in a clutch assembly;
   an arm extending from the rotational shaft to apply a rotating force to the rotational shaft; and
   a rotational member coupled to a distal end of the arm so as to rotate about a point at the distal end of the arm, the rotational member being configured to contact a rotational control member at a fixed or varying distance away from the point at the distal end of the arm about which the rotational member rotates to reduce a force required to rotate the distal end of the arm;

wherein the rotational control member is a clutch control cable having a first end coupled to a clutch lever, and a second end at a fixed point, a portion of the clutch control cable being accommodated by the rotational member, and wherein the rotational member is configured as a two-tiered pulley having a first tier adjacent to a second tier, the first tier being concentric to the second tier and having a larger diameter than the second tier, and such that a first point at which the clutch control cable extends from the second tier to the clutch lever is closer to the rotational center than is a second point at which the clutch control cable extends from the first tier to the fixed point.

* * * * *